US011422846B2

(12) United States Patent
Cao et al.

(10) Patent No.: US 11,422,846 B2
(45) Date of Patent: Aug. 23, 2022

(54) IMAGE REGISTRY RESOURCE SHARING AMONG CONTAINER ORCHESTRATORS IN A VIRTUALIZED COMPUTING SYSTEM

(71) Applicant: VMware, Inc., Palo Alto, CA (US)

(72) Inventors: Yanping Cao, San Carlos, CA (US); Zachary James Shepherd, San Francisco, CA (US); Mark Russell Johnson, McKinleyville, CA (US)

(73) Assignee: VMware, Inc.

( * ) Notice: Subject to any disclaimer, the term of this patent is extended or adjusted under 35 U.S.C. 154(b) by 39 days.

(21) Appl. No.: 16/933,823

(22) Filed: Jul. 20, 2020

(65) Prior Publication Data

US 2022/0019455 A1 Jan. 20, 2022

(51) Int. Cl.
*G06F 9/455* (2018.01)
*G06F 21/31* (2013.01)
*G06F 8/61* (2018.01)

(52) U.S. Cl.
CPC ............ *G06F 9/45558* (2013.01); *G06F 8/63* (2013.01); *G06F 9/45545* (2013.01); *G06F 21/31* (2013.01); *G06F 2009/45562* (2013.01); *G06F 2009/45587* (2013.01); *G06F 2009/45595* (2013.01)

(58) Field of Classification Search
CPC .... G06F 9/45558; G06F 8/63; G06F 9/45545; G06F 21/31; G06F 2009/45562; G06F 2009/45587; G06F 2009/45595
See application file for complete search history.

(56) References Cited

U.S. PATENT DOCUMENTS

| 10,191,778 | B1 * | 1/2019 | Yang .................. G06Q 30/0635 |
| 2016/0330277 | A1 * | 11/2016 | Jain ...................... H04L 67/1095 |
| 2017/0180346 | A1 * | 6/2017 | Suarez ...................... G06F 8/71 |
| 2017/0371693 | A1 | 12/2017 | Corrie et al. |
| 2018/0287902 | A1 * | 10/2018 | Chitalia ................ H04L 43/045 |
| 2018/0367528 | A1 * | 12/2018 | Schwarz ................. H04L 63/08 |
| 2019/0116110 | A1 * | 4/2019 | Raney ..................... H04L 43/50 |

(Continued)

OTHER PUBLICATIONS

Steve Buchanan; Introducing Azure Kubernetes Service; Dec. 10, 2019; (Year: 2019).*

(Continued)

*Primary Examiner* — Dong U Kim
(74) *Attorney, Agent, or Firm* — Kim & Stewart LLP

(57) ABSTRACT

A virtualized computing system according to an example includes: a host cluster having hosts and a virtualization layer executing on hardware platforms of the hosts, the virtualization layer supporting execution of virtual machines (VMs); a container image registry configured to manage container images for deploying containers in the host cluster; an orchestration control plane integrated with the virtualization layer, the orchestration control plane including a master server executing in a first VM of the VMs, the master server configured to manage image secrets based on accounts in the container image registry; and a guest cluster, managed by the orchestration control plane and executing in second VMs of the VMs, the guest cluster configured to receive the image secrets from the master server and access the container image registry using the image secrets.

20 Claims, 9 Drawing Sheets

(56) References Cited

U.S. PATENT DOCUMENTS

2020/0067789 A1* 2/2020 Khuti .................... G06F 16/254

OTHER PUBLICATIONS

Ernst, E. et al. "Kata Containers Architecture," GitHub, Inc., 2019, 22 pages, URL: https://github.com/kata-containers/documentation/blob/master/design/architecture.md.

Github, Inc. "Architecture Overview of Harbor," 2016, 5 pages, URL: https://github.com/goharbor/harbor/wiki/Architecture-Overview-of-Harbor/9ce0665e1a8d14fb6a12ba8029df778a151de386.

Github, Inc. "Harbor Registry User Guide," 2019, 101 pages, URL: https://github.com/goharbor/harbor/blob/release-1.9.0/docs/user_guide.md#robot-account.

Kubernetes, "The Cluster API Book," v1alpha3, Date Unknown, 206 pages, retrieved Jul. 31, 2020, URL: https://cluster-api.sigs.k8s.io/print.html.

Lipovetsky, D. "Cluster API v1alpha3 Delivers New Features and an Improved User Experience," Kubernetes Blog, Apr. 21, 2020, 6 pages, URL: https://kubernetes.io/blog/2020/04/21/cluster-api-v1alpha3-delivers-new-features-and-an-improved-user-experience/.

VMware, Inc. "Overview of vSphere Integrated Containers," Product version: 1.5, 2019, 21 pages.

U.S. Appl. No. 16/751,529, filed Jan. 24, 2020, 48 pages.

* cited by examiner

IMAGE REGISTRY RESOURCE SHARING AMONG CONTAINER ORCHESTRATORS IN A VIRTUALIZED COMPUTING SYSTEM

Applications today are deployed onto a combination of virtual machines (VMs), containers, application services, and more. For deploying such applications, a container orchestration platform known as Kubernetes® has gained in popularity among application developers. Kubernetes provides a platform for automating deployment, scaling, and operations of application containers across clusters of hosts. It offers flexibility in application development and offers several useful tools for scaling.

In a Kubernetes system, containers are grouped into logical unit called "pods" that execute on nodes. Containers in the same pod share the same resources and network and maintain a degree of isolation from containers in other pods. A container registry provides container image services on behalf of container engines executing in the nodes. Container image services include pulling container images from, and pushing container images to, the container registry. Users can access a container registry using a client of the container engine or through the Kubernetes using a Kubernetes secret.

The container image registry supports logical containers of images and image repositories (referred to herein as "projects"). A project can have members (e.g., users) that are assigned roles (e.g., developer, guest, etc.). A project in a container image registry can be private to a Kubernetes cluster. In some cases, it is desirable to allow the private project to be shared with another Kubernetes cluster, such as a Kubernetes cluster nested within another Kubernetes cluster.

SUMMARY

A virtualized computing system according to one embodiment includes: a host cluster having hosts and a virtualization layer executing on hardware platforms of the hosts, the virtualization layer supporting execution of virtual machines (VMs); a container image registry configured to manage container images for deploying containers in the host cluster; an orchestration control plane integrated with the virtualization layer, the orchestration control plane including a master server executing in a first VM of the VMs, the master server configured to manage image secrets based on accounts in the container image registry; and a guest cluster, managed by the orchestration control plane and executing in second VMs of the VMs, the guest cluster configured to receive the image secrets from the master server and access the container image registry using the image secrets.

A method of managing access to a container image registry in a virtualized computing system is also described. The container image registry manages container images for deploying containers in a host cluster, the host cluster including hosts and a virtualization layer executing on hardware platforms of the hosts, the virtualization layer supporting execution of VMs. The method includes: creating, by a registry agent, a robot account in the container image registry; creating, by the registry agent, image secrets in a master server of an orchestration control plane integrated with the virtualization layer, the orchestration control plane including a master server executing in a first VM of the VMs; providing the image secrets to a guest cluster managed by the orchestration control plane and executing in second VMs of the VMs, the image secrets enabling the guest cluster to access the container image registry through the robot account.

Further embodiments include a non-transitory computer-readable storage medium comprising instructions that cause a computer system to carry out the above method.

DETAILED DESCRIPTION

Figure 1:
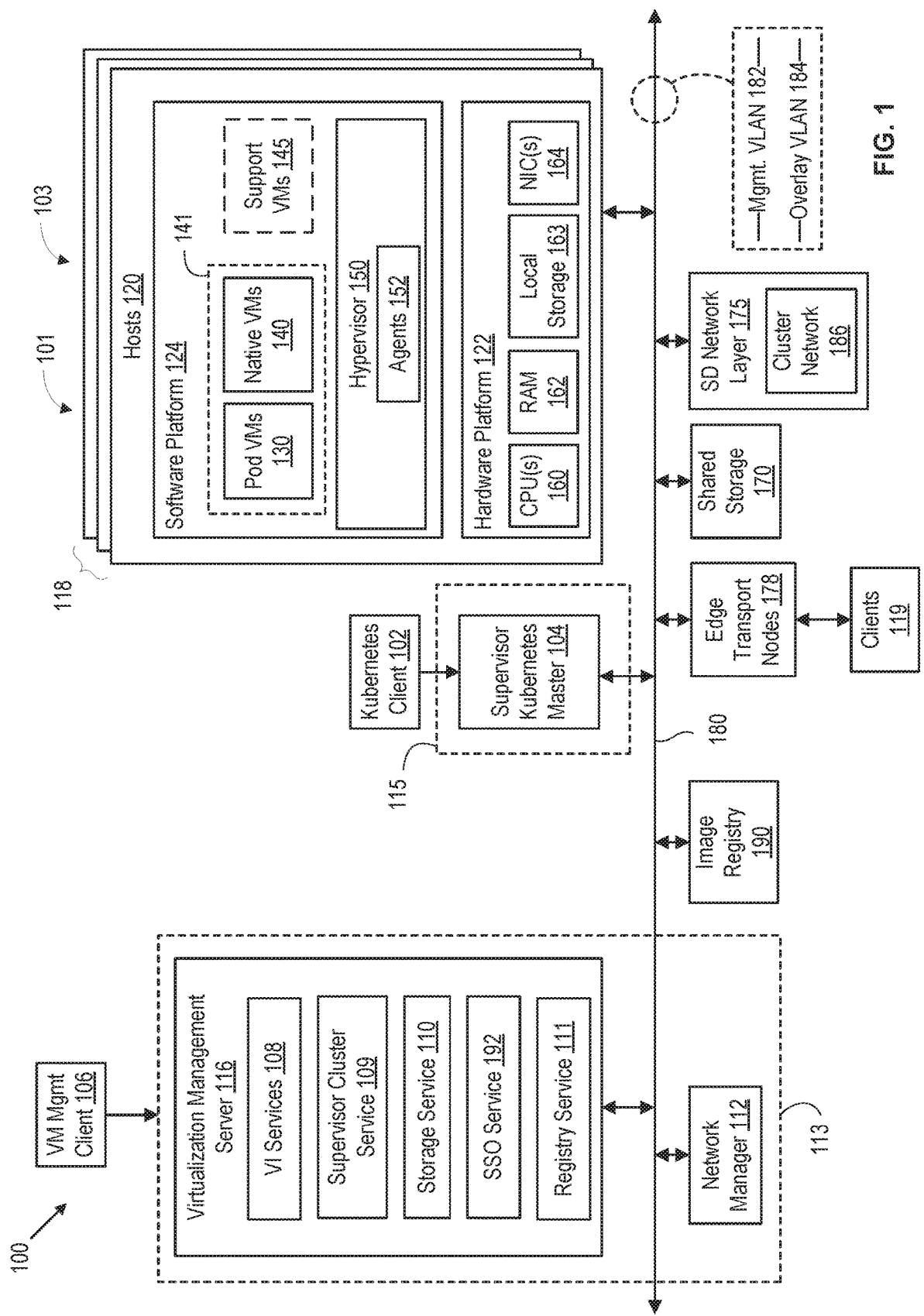
FIG. 1 is a block diagram of a virtualized computing system in which embodiments may be implemented.

Techniques for image registry resource sharing among container orchestrators in a virtualized computing system are described. The virtualized computing system includes a cluster of hosts having a virtualization layer executing on host hardware platforms. The virtualization layer supports execution of virtual machines (VMs). A virtualization management server manages host clusters, the virtualization layers, and the VMs executing thereon. In embodiments, the virtualization layer of a host cluster is integrated with a container orchestration control plane, such as a Kubernetes control plane. This integration provides a "supervisor cluster" (i.e., management cluster) that uses VMs to implement both control plane nodes and compute objects managed by the Kubernetes control plane. For example, Kubernetes pods are implemented as "pod VMs," each of which includes a kernel and container engine that supports execution of containers. The Kubernetes control plane of the supervisor cluster is extended to support VM objects in addition to pods, where the VM objects are implemented using native. VMs (as opposed to pod VMs). A virtualization infrastructure administrator (VI admin) can enable a host cluster as a supervisor cluster and provide its functionality to development teams. The VI admin creates "supervisor namespaces" within the supervisor cluster control plane, which provide resource-constrained and authorization-constrained units of multi-tenancy. Development teams deploy their applications within the scope of the supervisor namespaces and subject to their constraints.

As described above, the supervisor cluster control plane is extended to support custom VM objects in addition to pods. In embodiments, the controlled extensibility of the supervisor cluster is leveraged to deliver a "guest cluster" as a custom object. The guest cluster comprises a standard Kubernetes control plane and associated nodes, as well as components for interfacing the underlying supervisor cluster. The guest duster executes within compute objects of managed by the supervisor cluster (e.g., native VMs or both native VMs and pod VMs) and utilizes networking and storage exposed by the supervisor cluster. In this manner, a guest cluster is a virtual extension of an underlying management cluster (i.e., the supervisor cluster).

In one or more embodiments, the virtualized computing system includes a container image registry, integrated with the host cluster, to provide container image services for containerized workloads executing in the supervisor cluster. A container image (also referred to herein as an "image") is a read-only template with instructions for creating a container (e.g., a container is an executable instance of an image). The container image registry (also referred to as "image registry") stores images and image repositories (e.g., a set of versions of an image). A VI administrator provisions and manages the lifecycle of the image registry. Once provisioned and configured, the developers can pull images from the image registry when deploying containers in the supervisor cluster. In addition, developers can pull images directly from, and push images directly to, the image registry. In a supervisor cluster, the orchestration control plane can pull images from the image registry when deploying pod VMs. The image registry exposes an application programming interface (API) for use by clients (e.g., users or the orchestration control plane) for pulling and pushing images. In embodiments, the supervisor cluster configures the container image registry to be shared with a guest cluster executing within a supervisor cluster. These and further advantages and aspects of the disclosed architecture are described below with respect to the drawings.

FIG. 1 is a block diagram of a virtualized computing system 100 in which embodiments described herein may be implemented. System 100 includes a cluster of hosts 120 ("host cluster 118") that may be constructed on server-grade hardware platforms such as an x86 architecture platforms. For purposes of clarity, only one host cluster 118 is shown. However, virtualized computing system 100 can include many of such host clusters 118. As shown, a hardware platform 122 of each host 120 includes conventional components of a computing device, such as one or more central processing units (CPUs) 160, system memory (e.g., random access memory (RAM) 162), one or more network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a physical network 180. Physical network 180 enables communication between hosts 120 and between other components and hosts 120 (other components discussed further herein). Physical network 180 can include a plurality of VLANs to provide external network virtualization as described further herein.

In the embodiment illustrated in FIG. 1, hosts 120 access shared storage 170 by using NICs 164 to connect to network 180. In another embodiment, each host 120 contains a host bus adapter (HBA) through which input/output operations (IOs) are sent to shared storage 170 over a separate network (e.g., a fibre channel (FC) network). Shared storage 170 include one or more storage arrays, such as a storage area network (SAN), network attached storage (NAS), or the like. Shared storage 170 may comprise magnetic disks, solid-state disks, flash memory, and the like as well as combinations thereof. In some embodiments, hosts 120 include local storage 163 (e.g., hard disk drives, solid-state drives, etc.). Local storage 163 in each host 120 can be aggregated and provisioned as part of a virtual SAN, which is another form of shared storage 170.

A software platform 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 (collectively hypervisors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) may be concurrently instantiated and executed. One example of hypervisor 150 that may be configured and used in embodiments described herein is a VMware ESXi™ hypervisor provided as part of the VMware vSphere® solution made commercially available by VM ware, Inc. of Palo Alto, Calif.

In the example of FIG. 1, host cluster 118 is enabled as a "supervisor cluster," described further herein, and thus VMs executing on each host 120 include pod VMs 130 and native VMs 140. A pod VM 130 is a virtual machine that includes a kernel and container engine that supports execution of containers, as well as an agent (referred to as a pod VM agent) that cooperates with a controller of an orchestration control plane 115 executing in hypervisor 150 (referred to as a pod VM controller). An example of pod VM 130 is described further below with respect to FIG. 2. VMs 130/140 support applications 141 deployed onto host cluster 118, which can include containerized applications (e.g., executing in either pod VMs 130 or native VMs 140) and applications executing directly on guest operating systems (non-containerized) (e.g., executing in native VMs 140). One specific application discussed further herein is a guest cluster executing as a virtual extension of a supervisor cluster. Some VMs 130/140, shown as support VMs 145, have specific functions within host cluster 118. For example, support VMs 145 can provide control plane functions, edge transport, functions, and the like. An embodiment of software platform 124 is discussed further below with respect to FIG. 2.

Host cluster 118 is configured with a software-defined (SD) network layer 175, SD network layer 175 includes logical network services executing on virtualized infrastructure in host cluster 118. The virtualized infrastructure that supports the logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches, logical routers, logical firewalls, logical virtual private networks (VPNs), logical load balancers, and the like, implemented on top of the virtualized infrastructure. In embodiments, virtualized computing system 100 includes edge transport nodes 178 that provide an interface of host cluster 118 to an external network (e.g., a corporate network, the public Internet, etc.).

Edge transport nodes 178 can include a gateway between the internal logical networking of host cluster 118 and the external network. Edge transport nodes 178 can be physical servers or VMs. For example, edge transport nodes 178 can be implemented in support VMs 145 and include a gateway of SD network layer 175. Various clients 119 can access service(s) in virtualized computing system through edge transport nodes 178 (including VM management client 106 and Kubernetes client 102, which as logically shown as being separate by way of example).

Virtualization management server 116 is a physical or virtual server that manages host cluster 118 and the virtualization layer therein. Virtualization management server 116 installs agent(s) 152 in hypervisor 150 to add a host 120 as a managed entity. Virtualization management server 116 logically groups hosts 120 into host cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in host cluster 118 may be one or many. Virtualization management server 116 can manage more than one host cluster 118.

In an embodiment, virtualization management server 116 further enables host cluster 118 as a supervisor cluster 101. Virtualization management server 116 installs additional agents 152 in hypervisor 150 to add host 120 to supervisor cluster 101. Supervisor cluster 101 integrates an orchestration control plane 115 with host cluster 118. In embodiments, orchestration control plane 115 includes software components that support a container orchestrator, such as Kubernetes, to deploy and manage applications on host cluster 118. By way of example, a Kubernetes container orchestrator is described herein. In supervisor cluster 101, hosts 120 become nodes of a Kubernetes cluster and pod VMs 130 executing on hosts 120 implement Kubernetes pods. Orchestration control plane 115 includes supervisor Kubernetes master 104 and agents 152 executing in virtualization layer (e.g., hypervisors 150). Supervisor Kubernetes master 104 includes control plane components of Kubernetes, as well as custom controllers, custom plugins, scheduler extender, and the like that extend Kubernetes to interface with virtualization management server 116 and the virtualization layer. For purposes of clarity, supervisor Kubernetes master 104 is shown as a separate logical entity. For practical implementations, supervisor Kubernetes master 104 is implemented as one or more VM(s) 130/140 in host cluster 118. Further, although only one supervisor Kubernetes master 104 is shown, supervisor cluster 101 can include more than one supervisor Kubernetes master 104 in a logical cluster for redundancy and load balancing.

In an embodiment, virtualized computing system 100 further includes a storage service 110 that implements a storage provider in virtualized computing system 100 for container orchestrators. In embodiments, storage service 110 manages lifecycles of storage volumes (e.g., virtual disks) that back persistent volumes used by containerized applications executing in host cluster 118. A container orchestrator such as Kubernetes cooperates with storage service 110 to provide persistent storage for the deployed applications. In the embodiment of FIG. 1, supervisor Kubernetes master 104 cooperates with storage service 110 to deploy and manage persistent storage in the supervisor cluster environment. Other embodiments described below include a vanilla container orchestrator environment and a guest cluster environment. Storage service 110 can execute in virtualization management server 116 as shown or operate independently from virtualization management server 116 (e.g., as an independent physical or virtual server).

In an embodiment, virtualized computing system 100 further includes a network manager 112. Network manager 112 is a physical or virtual server that orchestrates SD network layer 175. In an embodiment, network manager 112 comprises one or more virtual servers deployed as VMs. Network manager 112 installs additional agents 152 in hypervisor 150 to add a host 120 as a managed entity, referred to as a transport node. In this manner, host cluster 118 can be a cluster 103 of transport nodes. One example of an SD networking platform that can be configured and used in embodiments described herein as network manager 112 and SD network layer 175 is a VMware NSX® platform made commercially available by VMware Inc. of Palo Alto, Calif.

Network manager 112 can deploy one or more transport zones in virtualized computing system 100, including VLAN transport zone(s) and an overlay transport zone. A VLAN transport zone spans a set of hosts 120 (e.g., host cluster 118) and is backed by external network virtualization of physical network 180 (e.g., a VLAN). One example VLAN transport zone uses a management VLAN 182 on physical network 180 that enables a management network connecting hosts 120 and the VI control plane (e.g., virtualization management server 116 and network manager 112). An overlay transport zone using overlay VLAN 184 on physical network 180 enables an overlay network that spans a set of hosts 120 (e.g., host cluster 118) and provides internal network virtualization using software components (e.g., the virtualization layer and services executing in VMs). Host-to-host traffic for the overlay transport zone is carded by physical network 180 on the overlay VLAN 184 using layer-2-over-layer-3 tunnels. Network manager 112 can configure SD network layer 175 to provide a cluster network 186 using the overlay network. The overlay transport zone can be extended into at least one of edge transport nodes 178 to provide ingress/egress between cluster network 186 and an external network.

In an embodiment, system 100 further includes an image registry 190. Containers of supervisor cluster 101 execute in pod VMs 130, and containers managed by a guest cluster execute in pod VMs 130 and/or native VMs 140. The containers in VMs 130/140 are spun up from container images managed by image registry 190. Image registry 190 manages images and image repositories stored on an image volume. The image volume includes persistent storage provisioned from shared storage 170.

Virtualization management server 116 and network manager 112 comprise a virtual infrastructure (VI) control plane 113 of virtualized computing system 100. Virtualization management server 116 can include a supervisor cluster service 109, storage service 110, VI services 108, SSO service 192, and registry service 111. Supervisor cluster service 109 enables host cluster 118 as supervisor cluster 101 and deploys the components of orchestration control plane 115. VI services 108 include various virtualization management services, such as a distributed resource scheduler (DRS), high-availability (HA) service, virtualization management daemon, and the like. DRS is configured to aggregate the resources of host cluster 118 to provide resource pools and enforce resource allocation policies. DRS also provides resource management in the form of load balancing, power management, VM placement, and the like. HA service is configured to pool VMs and hosts into a monitored cluster and, in the event of a failure, restart VMs on alternate hosts in the cluster. A single host is elected as a master, which communicates with the HA service and monitors the state of protected VMs on subordinate hosts. The HA service uses admission control to ensure enough resources are reserved in the cluster for VM recovery when a host fails. SSO service comprises security token service, administration server, directory service, identity management service, and the like configured to implement an SSO platform for authenticating users. The virtualization management daemon is configured to manage objects, such as data centers, clusters, hosts, VMs, resource pools, datastores, and the like.

SSO service 192 comprises security token service, administration server, directory service, identity management service, and the like configured to implement an 550 platform for virtualized computing system 100. Virtualization management server 116 manages objects, such as data centers, clusters, hosts, VMs, resource pools, datastores, and the like, each of which are assigned permissions. Each permission specifies for one group or user which privileges that group or user has on the object. SSO service 192 authenticates users and groups of users defined in an identity source. Users are provided 550 credentials to login to the SSO platform (e.g., username and password). Privileges, which are fine grained access controls, are assigned to authenticated users and groups. Virtualization management server 116 can have defined roles, each of which is a set of privileges. Roles allow a VI admin to assign permissions on an object based on a typical set of tasks that users perform.

Registry service 111 administers image registry 190. Registry service 111 includes a resource model having registry, project, and image objects. The registry object represents image registry 190 for host cluster 118. The project object represents a logical container for storing images. The image object represents an individual image in a project. Registry service 111 is configured to perform lifecycle management of image registry 190, lifecycle management of projects, image registry health monitoring, project and image statistic collection, project and image replication, and the like.

A VI admin can interact with virtualization management server 116 through a VM management client 106. Through VM management client 106, a VI admin commands virtualization management server 116 to form host cluster 118, configure resource pools, resource allocation policies, and other cluster-level functions, configure storage and networking, enable supervisor cluster 101, deploy and manage image registry 190, and the like.

Kubernetes client 102 represents an input interface for a user to supervisor Kubernetes master 104. Kubernetes client 102 can be kubectl, for example. Through Kubernetes client 102, a user submits desired states of the Kubernetes system, e.g., as YAML documents, to supervisor Kubernetes master 104. In embodiments, the user submits the desired states within the scope of a supervisor namespace. A "supervisor namespace" is a shared abstraction between VI control plane 113 and orchestration control plane 115. Each supervisor namespace provides resource-constrained and authorization-constrained units of multi-tenancy. A supervisor namespace provides resource constraints, user-access constraints, and policies (e.g., storage policies, network policies, etc.). Resource constraints can be expressed as quotas, limits, and the like with respect to compute (CPU and memory), storage, and networking of the virtualized infrastructure (host cluster 118, shared storage 170, SD network layer 175). User-access constraints include definitions of users, roles, permissions, bindings of roles to users, and the like. Each supervisor namespace is expressed within orchestration control plane 115 using a namespace native to orchestration control plane 115 (e.g., a Kubernetes namespace or generally a "native namespace"), which allows users to deploy applications in supervisor cluster 101 within the scope of supervisor namespaces. In this manner, the user interacts with supervisor Kubernetes master 104 to deploy applications in supervisor cluster 101 within defined supervisor namespaces.

While FIG. 1 shows an example of a supervisor cluster 101, the techniques described herein do not require a supervisor duster 101. In some embodiments, host duster 118 is not enabled as a supervisor cluster 101. In such case, supervisor Kubernetes master 104, Kubernetes client 102, pod Vis 130, supervisor cluster service 109, and image registry 190 can be omitted. While host cluster 118 is show as being enabled as a transport node cluster 103, in other embodiments network manager 112 can be omitted. In such case, virtualization management server 116 functions to configure SD network layer 175.

Figure 2:
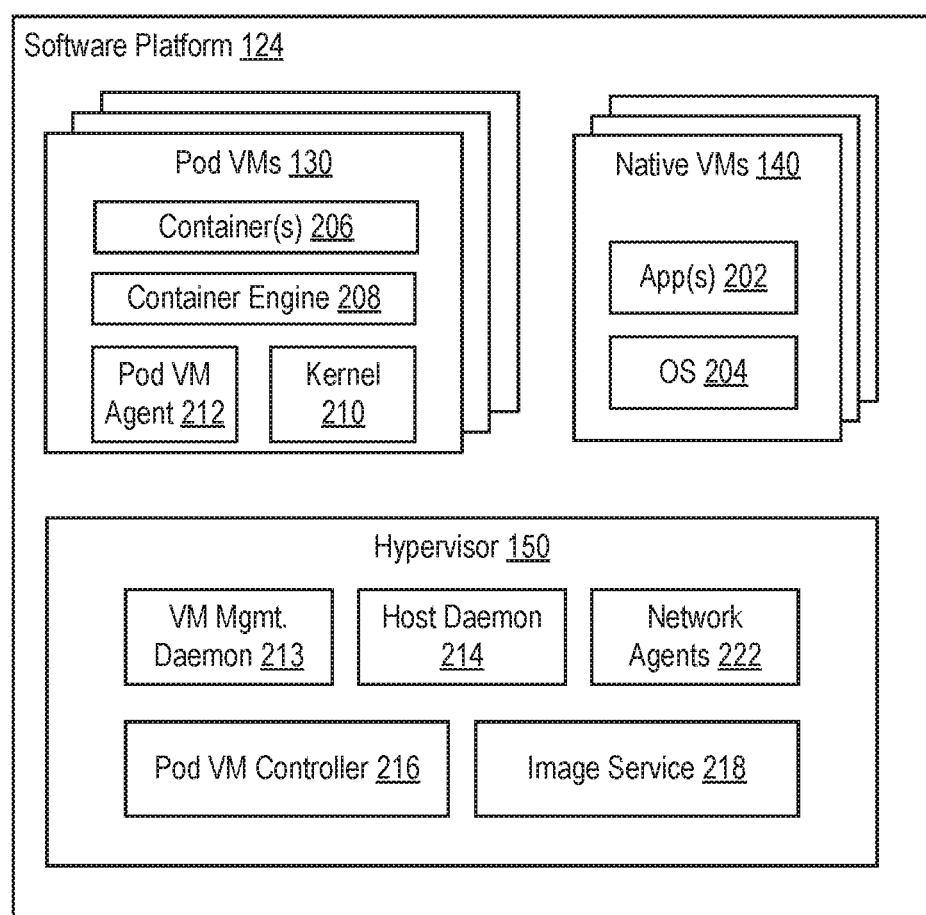
FIG. 2 is a block diagram depicting a software platform according an embodiment.

FIG. 2 is a block diagram depicting software platform 124 according an embodiment. As described above, software platform 124 of host 120 includes hypervisor 150 that supports execution of pod VMs 130 and native VMs 140. In an embodiment, hypervisor 150 includes a VM management daemon 213, a host daemon 214, a pod VM controller 216, an image service 218, and a network agent 222. VM management daemon 213 is a control plane agent 152 of VI control plane 113. VM management daemon 213 provides an interface to host daemon 214 for VM management server 116. Host daemon 214 is configured to create and destroy VMs (e.g., pod VMs 130 and native VMs 140).

Pod VM controller 216 is a control plane agent 152 of orchestration control plane 115 for supervisor cluster 101 and allows Kubernetes master 104 to interact with hypervisor 150. Pod VM controller 216 configures the respective host as a node in orchestration control plane 115. Pod VM controller 216 manages the lifecycle of pod VMs 130, such as determining when to spin-up or delete a pod VM. Pod VM controller 216 also ensures that any pod dependencies, such as container images, networks, and volumes are available and correctly configured.

Image service 218 is configured to download and extract container images to shared storage 170 such that the container images can be mounted by pod VMs 130. Image service 218 is also responsible for managing the storage available for container images within shared storage 170. This includes managing authentication with image registry 190, assuring providence of container images by verifying signatures, updating container images when necessary, and garbage collecting unused container images.

Network agent 222 comprises a control plane agent 152 of SD networking 175. Network agent 222 is configured to cooperate with network management and control planes (e.g., network manager 112) to implement logical network resources. Network agent 222 configures the respective host as a transport node in a transport zone managed by network manager 112.

Each pod VM 130 has one or more containers 206 running therein in an execution space managed by container engine 208. The lifecycle of containers 206 is managed by pod VM agent 212. Both container engine 208 and pod VM agent 212 execute on top of a kernel 210 (e.g., a Linux kernel). Each native VM 140 has applications 202 running therein on top of an OS 204. Native VMs 140 do not include pod VM agents and are isolated from pod VM controller 216. Container engine 208 can be an industry-standard container engine, such as libcontainer, rune, or containerd.

Each of containers 206 has a corresponding container image (CI) stored as a read-only virtual disk in shared storage 170. These read-only virtual disks are referred to herein as CI disks. Additionally, each pod VM 130 has a virtual disk provisioned in shared storage 170 for reads and writes. These read-write virtual disks are referred to herein as ephemeral disks. When a pod VM is deleted, its ephemeral disk is also deleted. In some embodiments, ephemeral disks can be stored on a local storage of a host because they are not shared by different hosts. Container volumes are used to preserve the state of containers beyond their lifetimes. Container volumes are stored in virtual disks of shared storage 170.

Figure 3:
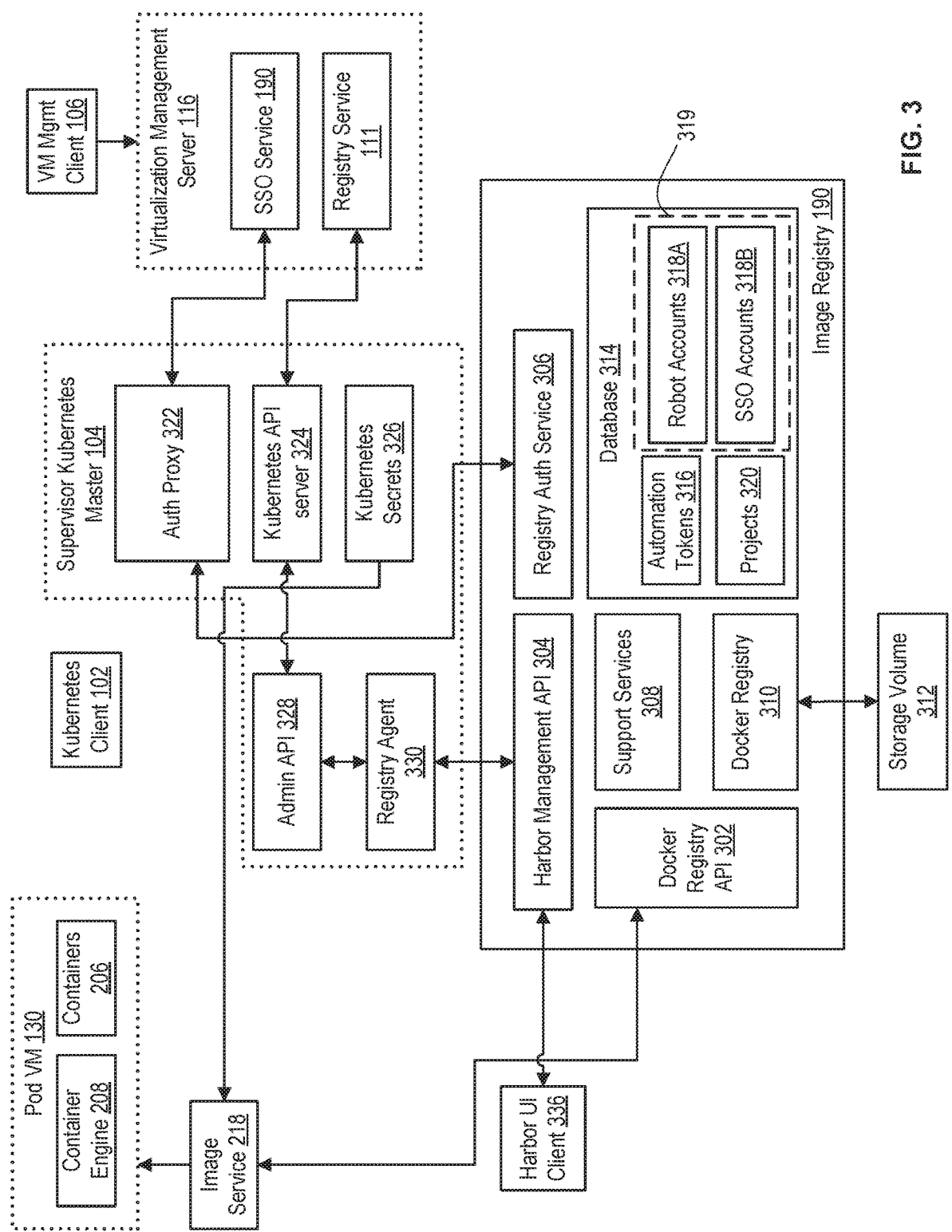
FIG. 3 is a block diagram depicting a logical relationship of components in virtualized computing system with respect to image registry access, authentication, and authorization according to an embodiment.

FIG. 3 is a block diagram depicting a logical relationship of components in virtualized computing system 100 with respect to image registry access, authentication, and authorization according to an embodiment. In embodiments, image registry 190 comprises a Harbor registry. Harbor is an open-source container image registry that secures images with role-based access control, scans, images for vulnerabilities, and signs images as trusted. While Harbor is described in the embodiments, other image registries configured the same or similar to that shown in FIG. 3 can be employed. In embodiments, image registry 190 encapsulates a Docker® registry. A Docker registry is an image registry configured to store and manage Docker images, which are templates for deploying containers in the Docker container engine. While Docker is described in the embodiments, other image registries and container engines configured the same or similar to that shown in FIG. 3 can be employed.

Image registry 190 includes a Docker registry API 302, a Harbor management API 304, a registry authentication (auth) service 306, support services 308, a Docker registry 310, and a database 314. Image registry 190 maintains state information, including automation tokens 316, robot accounts 318A, SSO accounts 318B, and projects 320. Robot accounts 318A represent automation users, and SSO accounts 318B represent SSO users managed by SSO service 192. Robot accounts 318A and SSO accounts 318B are collectively referred to as user accounts 318 or generally as members 319 of projects 320. A member 319 can be an automation user with a robot account 318A, or an SSO user with an SSO account 318a Image registry 190 does not store credentials for SSO accounts 318B, which are instead maintained by the SSO platform in virtualized computing system 100 (e.g., SSO service 192).

By way of example, the state data is shown stored in database 314. However, some or all the state data can be stored and managed by other components in image registry 190. Docker registry API 302 and Harbor management API 304 provide an interface to image registry 190. Docker registry API 302 provides an interface to clients for login to image registry 190 and, if authenticated and authorized, to push and/or pull images through Docker registry 310. Harbor management API 304 provides an interface to clients for management of image registry 190, including configuration of security policy, add/remove users in projects, add/remove projects, system configurations, and the like. Docker registry 310 is the central component that stores and maintains images in storage volume 312. Support services 308 include extended service components, such as image scanning, image signing, image replication, and the like. Database 314 stores metadata and/or state data for image registry 190. Registry auth service 306 is configured to perform authentication and authorization checks based on user identities and roles, as described further herein. Registry auth service 306 comprises at least a portion of credential manager 123.

The remaining portion of cluster image registry 121 includes registry service 111 and a registry agent 330. In embodiments, registry service 111 is deployed in virtualization management server 116 along with 850 service 192 as described above. Registry service 111 can deploy a registry agent 330. Registry service 111 invokes an admin API 328 of registry agent 330 to deploy image registry 190. Registry service 111 also invokes admin API 328 of registry agent 330 to perform configuration and management of image registry 190 through Harbor management API 304. That is, registry service 111 invokes admin API 328 of registry agent 330, and registry agent 330 invokes Harbor management API 304 for configuration and management of image registry 190.

In embodiments, image registry 190 and registry agent 330 are deployed in VMs (e.g., as containers in pod VMs 130). Registry agent 330 can be an extension of a Kubernetes API server 324. Kubernetes provides two mechanisms for extending the Kubernetes API. A first mechanism involves adding an extension API to the Kubernetes API, registering the extension API with an aggregation layer that proxies for calls to the extension API, and an API extension server that receives the extension API calls from the aggregation layer. The API extension server includes custom controllers for managing lifecycles of the API extension objects. A second mechanism involves adding a custom API to the Kubernetes API that manage custom resources defined using custom resource definitions (CRDs) and supplying custom controllers that manage the lifecycles of the custom resources.

In embodiments, admin API 328 is an extension API of Kubernetes API server 324, and registry agent 330 is an extension API server. As discussed further herein, virtualized computing system 100 can include a management network and a VM network, where the management network is isolated from the VM network. Virtualization management server 116 and supervisor Kubernetes master 104 are connected to the management network. VMs implementing the registry agent 330 (as an API extension server) and image registry 190 (e.g., executing in pod VMs 130) are connected to the VM network. Supervisor Kubernetes master 104 is also connected to the VM network. In such case, supervisor Kubernetes master 104 provides the proxy to enable communication between registry service 111 and registry agent 330. Registry service 111 invokes admin API 328 as extension APIs in Kubernetes API server 324, and registry agent 330 handles the invocations of admin API 328 as an extension API server. In other embodiments, admin API 328 is a custom API of Kubernetes API server 324, and registry agent 330 includes controllers in supervisor Kubernetes master 104. Registry service 111 interacts with registry agent 330 through calls to admin API 328 as a custom API in Kubernetes API master 324. Registry agent 330 in turn invokes Harbor management API 304. In cases where host cluster 118 is not enabled as a supervisor cluster, admin API 328 and registry agent 330 can be deployed in a VM 140 that is connected to both the management network and the VM network, which would enable direct communication between registry service 111 and registry agent 330 through admin API 328.

Figure 4:
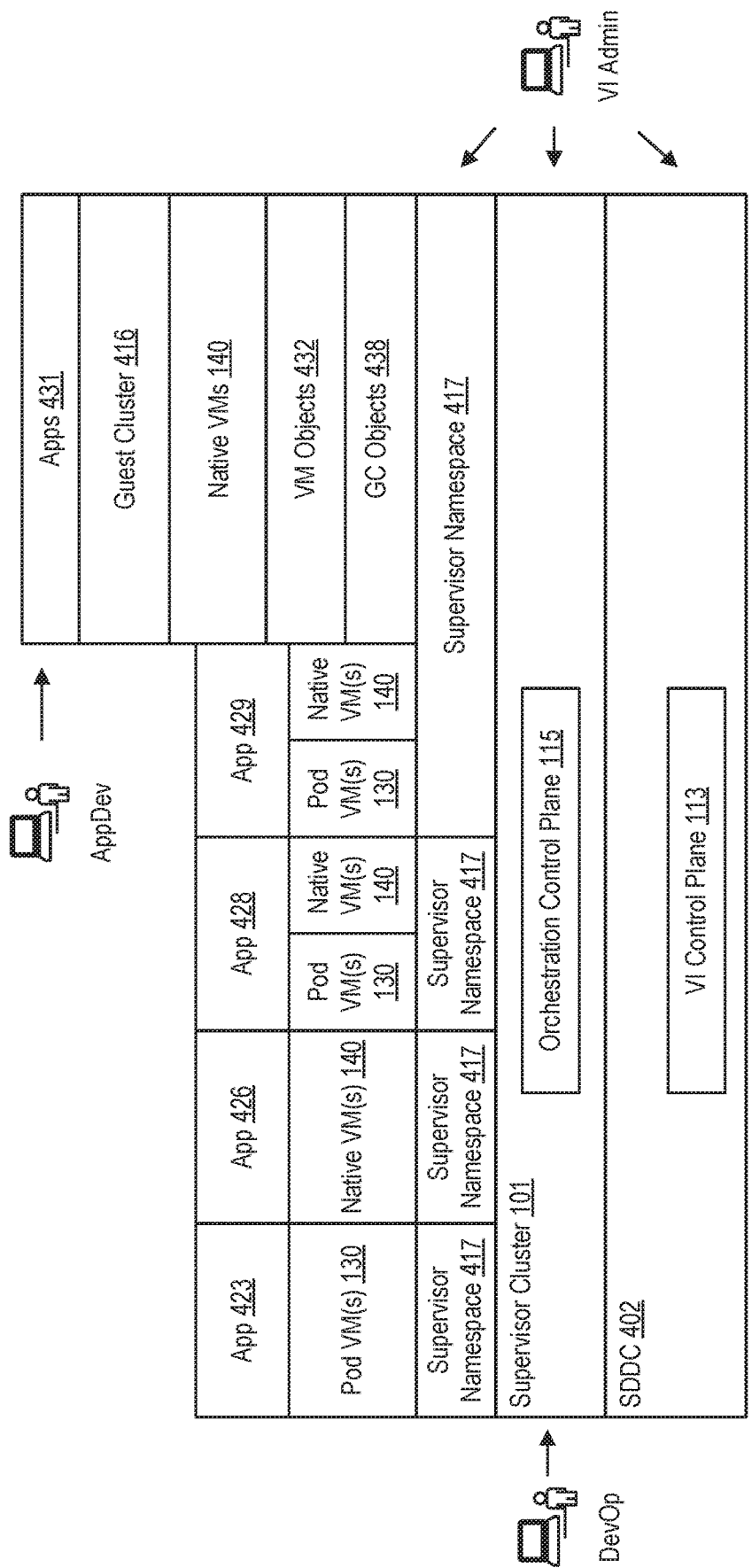
FIG. 4 is a block diagram depicting a guest cluster deployed as a victual extension of a supervisor cluster alongside other applications according to an embodiment.

FIG. 4 is a block diagram depicting a guest cluster deployed as a virtual extension of a supervisor cluster alongside other applications according to an embodiment. Supervisor cluster 101 is implemented by a software-defined data center (SDDC) 402. SDDC 402 includes virtualized computing system 100 shown in FIG. 1, including host cluster 118, VM management server 116, network manager 112, storage manager 110, shared storage 170, and SD networking 175. SDDC 402 includes VI control plane 113 for managing a virtualization layer of host cluster 118, along with shared storage 170 and SD networking 175. A VI admin interacts with VM management server 116 (and optionally network manager 112) of VI control plane 113 to configure SDDC 402 to implement supervisor cluster 101.

Supervisor cluster 101 includes orchestration control plane 115, which includes supervisor Kubernetes master(s) 104 and pod VM controllers 216. The VI admin interacts with VM management server 116 to create supervisor namespaces 117. Each supervisor namespace 117 includes a resource pool and authorization constraints. The resource pool includes various resource constraints on supervisor namespace 117 (e.g., reservation, limits, and share (RLS) constraints). Authorization constraints provide for with roles are permitted to perform which operations in supervisor namespace 117 (e.g., allowing VI admin to create, manage access, allocate resources, view, and create objects; allowing DevOps to view and create objects; etc.). A DevOp interacts with Kubernetes master 104 to deploy applications on supervisor cluster 101 within scopes of supervisor namespaces 117. In the example, the DevOp deploys an application 423 on pod VM(s) 130, an application 426 on native VM(s) 140, an application 428 on both pod VM(s) 130 and native VM(s) 140, and an application on pod VM(s) 130 and/or native VM(s) 140.

The DevOp also deploys guest cluster 416 on supervisor cluster 101 within a supervisor namespace 117. Guest cluster 416 is constrained by the authorization and resource policy applied by the supervisor namespace in which it is deployed. Guest cluster 416 can be deployed in supervisor namespace 117 along with other applications (e.g., application 429 executing on VM(s) 130/140). Guest cluster 416 supports execution of applications 431. Orchestration control plane 115 is configured to realize guest cluster 416 as a virtual extension of supervisor cluster 101. Orchestration control plane 115 includes GC objects 438 that represent guest cluster 416 and VM objects 432 that represent native VMs 140.

Figure 5:
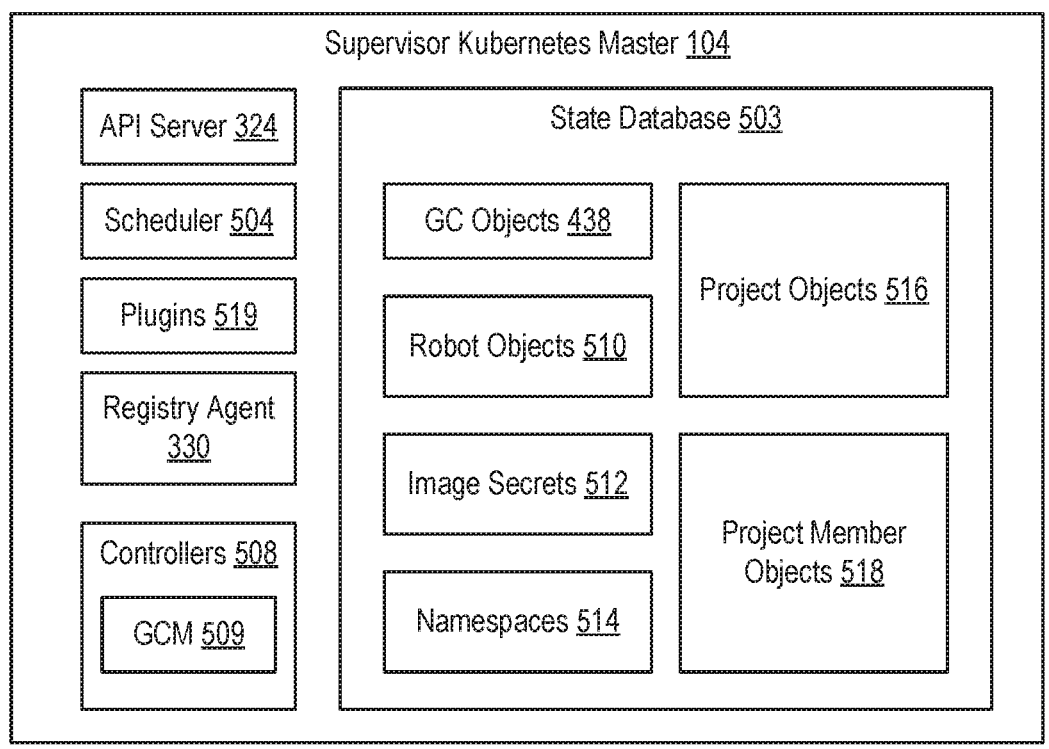
FIG. 5 is a block diagram of supervisor Kubernetes master according to an embodiment.

FIG. 5 is a block diagram of supervisor Kubernetes master 104 according to an embodiment. Supervisor Kubernetes master 104 includes application programming interface (API) server 324, a state database 503, a scheduler 504, controllers 508, plugins 519, and registry agent 330. Controllers 508 can include, for example, standard Kubernetes controllers, as well as custom controllers, such as a VM controller, guest cluster controllers, and platform lifecycle controller (PLC). In an embodiment, controllers 508 include a guest cluster manager (GCM) 509 configured to manager deployment of guest clusters. Plugins 519 can include, for example, a network plugin and a storage plugin.

API server 324 provides an API for use by Kubernetes client 102 (e.g., kube-apiserver). API server 324 is the front end of orchestration control plane 115. The Kubernetes API provides a declarative schema for creating, updating, deleting, and viewing objects. State database 503 stores the state of supervisor cluster 101 (e.g., etcd) as objects created by API server 324. A user can provide application specification data to API server 324 that defines various objects supported by the API (e.g., as a YAML document). The objects have specifications that represent the desired state. State database 503 stores the objects defined by application specification data as part of the supervisor cluster state. State database 503 can store. GC objects 438, robot objects 510, image secrets 512, namespaces 514, project Objects 516, and project member objects 518. For clarity, robot objects 510 are shown as separate logical objects. However, it is to be understood that robot objects 510 are not separate physical objects, but rather information that is stored with project members and image secrets.

Namespaces 514 provide scope for Kubernetes objects. Namespaces 514 are objects themselves maintained in state database 503. A namespace 514 can include resource quotas, limit ranges, role bindings, and the like that are applied to objects declared within its scope. A VI admin can cooperate with VM management server 116 to define supervisor namespaces for supervisor cluster 101. A supervisor namespace is a resource-constrained and authorization-constrained unit of multi-tenancy managed by VM management server 116. State database 503 stores namespace objects associated with the supervisor namespaces. VM management server 116 creates a namespace object 514 in supervisor Kubernetes master 104 for each supervisor namespace, pushing down resource constraints and authorization constraints into orchestration control plane 115. A namespace 514 is an example of a standard Kubernetes object.

Scheduler 504 watches state database 503 for newly created pods with no assigned node. A pod is an object supported by API server 324 that is a group of one or more containers, with network and storage, and a specification on how to execute. Scheduler 504 selects candidate nodes in supervisor cluster 101 for pods. Scheduler 504 (through a scheduler extender) cooperates with VM management server 116 (e.g., such as with resource scheduler 108) to select nodes from candidate sets of nodes and provide identities of hosts 120 corresponding to the selected nodes. For each pod, scheduler 504 also converts the pod specification to a pod VM specification and asks VM management server 116 to reserve a pod VM on the selected host 120. Scheduler 504 updates pods in state database 503 with host identifiers.

A controller 508 tracks objects in state database 503 of at least one resource type. Controller(s) 508 are responsible for making the current state of supervisor cluster 101 come closer to the desired state as stored in state database 503. A controller 508 can carry out action(s) by itself, send messages to API server 324 to have side effects, and/or interact with external systems. A PLC, for example, is responsible for tracking pods that have assigned nodes without pod VM identifiers. The PLC cooperates with VM management server 116 to commit reserved pod VMs for pods. VM management server 116 returns a pod VM identifier to the PLC which in turn updates the pod in state database 303.

Pods are native objects of Kubernetes. The Kubernetes API can be extended with custom APIs 305 to allow orchestration and management of custom objects 307. A custom resource definition (CRD) can be used to define a custom object 307 to be handled by API server 324. Alternatively, an extension API server can be used to introduce a custom object by API server aggregation, where the extension API server is fully responsible for the custom resource. A user interacts with custom APIs of API server 324 to create custom objects tracked in state database 503 (e.g., GC objects 438). A controller 508 is used to watch for and actuate on custom objects declared in state database 503 (e.g., GCM 509). In Kubernetes, a controller responsible for the lifecycle of custom resources is referred to as an "operator." However, the term controller will be used throughout this specification for consistency.

Plugins 519 provide a well-defined interface to replace a set of functionality of the Kubernetes control plane. A network plugin is responsible for configuration of logical networking of SD networking 175 to satisfy the needs of network-related resources. A storage plugin is responsible for providing a standardized interface for persistent storage lifecycle and management to satisfy the needs of resources requiring persistent storage.

Project objects 516 represent projects 320 created in image registry 190. Project member objects 518 represent SSO user members of projects 320 in image registry 190 (e.g., SSO accounts 318B). Robot objects 510 represent automation users of projects 320 in image registry 190 (e.g., robot accounts 318A). Image secrets 512 represent image push and pull secrets (e.g., Kubernetes secrets 326) for accessing image registry 190.

Figure 6:
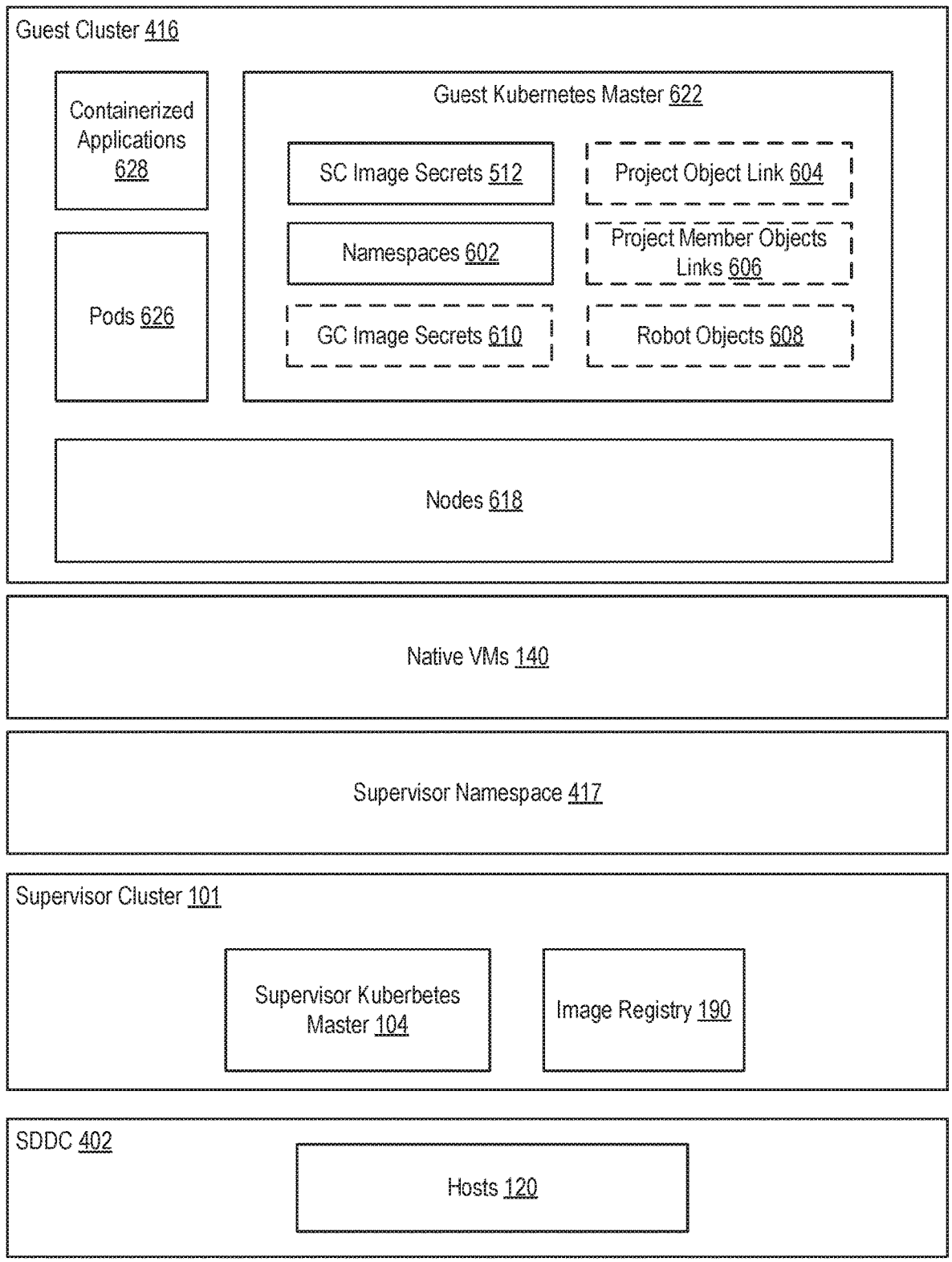
FIG. 6 is a block diagram depicting a guest cluster deployed as a virtual extension of a supervisor cluster in more detail according to an embodiment.

FIG. 6 is a block diagram depicting a guest cluster deployed as a virtual extension of a supervisor cluster in more detail according to an embodiment. In the embodiment, supervisor cluster 101 executes on hosts 120 of SDDC 402. Supervisor cluster 101 includes supervisor Kubernetes master 104 and image registry 190. Supervisor Kubernetes master 104 deploys guest cluster 416 within supervisor namespace 417 and executing on native VMs 140. Guest cluster 416 includes nodes 618 each corresponding to a native VM 140. Guest Kubernetes master 622 executes on node(s) 618 and manages deployment of pods 626. Pods 626 execute on nodes 618 and include containerized applications 628.

In an embodiment, supervisor Kubernetes master 104 provides image secrets 512 (designated supervisor cluster (SC) image secrets 512 in this embodiment) to guest Kubernetes master 622. Guest Kubernetes master 622 defines one or more namespaces 602. Guest Kubernetes master 622 uses SC image secrets 512 to access image registry 190 to pull images for containerized applications 628, as described further below. In such an embodiment, guest cluster 416 utilizes a project created for supervisor namespace 417 to pull container images for containerized applications 628. Guest cluster 622 thus shares the project with supervisor cluster 101. Supervisor cluster 101 creates the project upon creation of supervisor namespace 417 and can pull images for containerized applications executing in pod VMs 130, as discussed above. Shared access to the project for supervisor namespace 417 is facilitated by providing SC image secrets 512 from supervisor Kubernetes master 104 to guest Kubernetes master 622. Supervisor Kubernetes master 104 can keep SC image secrets 512 cached in guest Kubernetes master 622 up-to-date as the image secrets are changed over time.

In another embodiment, supervisor Kubernetes master 104 creates a separate project in image registry 190 for guest cluster 416 upon deploying guest cluster 416. In such an embodiment, guest Kubernetes master 622 maintains GC image secrets 610, project object link 604, project member object links 606, and robot objects 608 corresponding to the project created for guest cluster 416. Project object link 604 is a link to the project created in image registry 190 for the guest cluster 416. Project member object links 606 are links to the SSO users configured to access the guest cluster project. Robot objects 608 represent the automation users configured to access the guest cluster project. GC image secrets 610 represent the push and pull secrets used to access image registry 190 when pushing or pulling images from the guest cluster project. Supervisor Kubernetes master 104 can create the guest cluster project upon creation of guest cluster 416 and can delete the guest cluster project and associated data (e.g., project members, robot accounts, etc.) upon deleting guest cluster 416. In another embodiment, guest cluster 416 both uses its own guest cluster project and shares the supervisor cluster project created for supervisor namespace 417 (e.g., a combination of the two embodiments described above).

Figure 7:
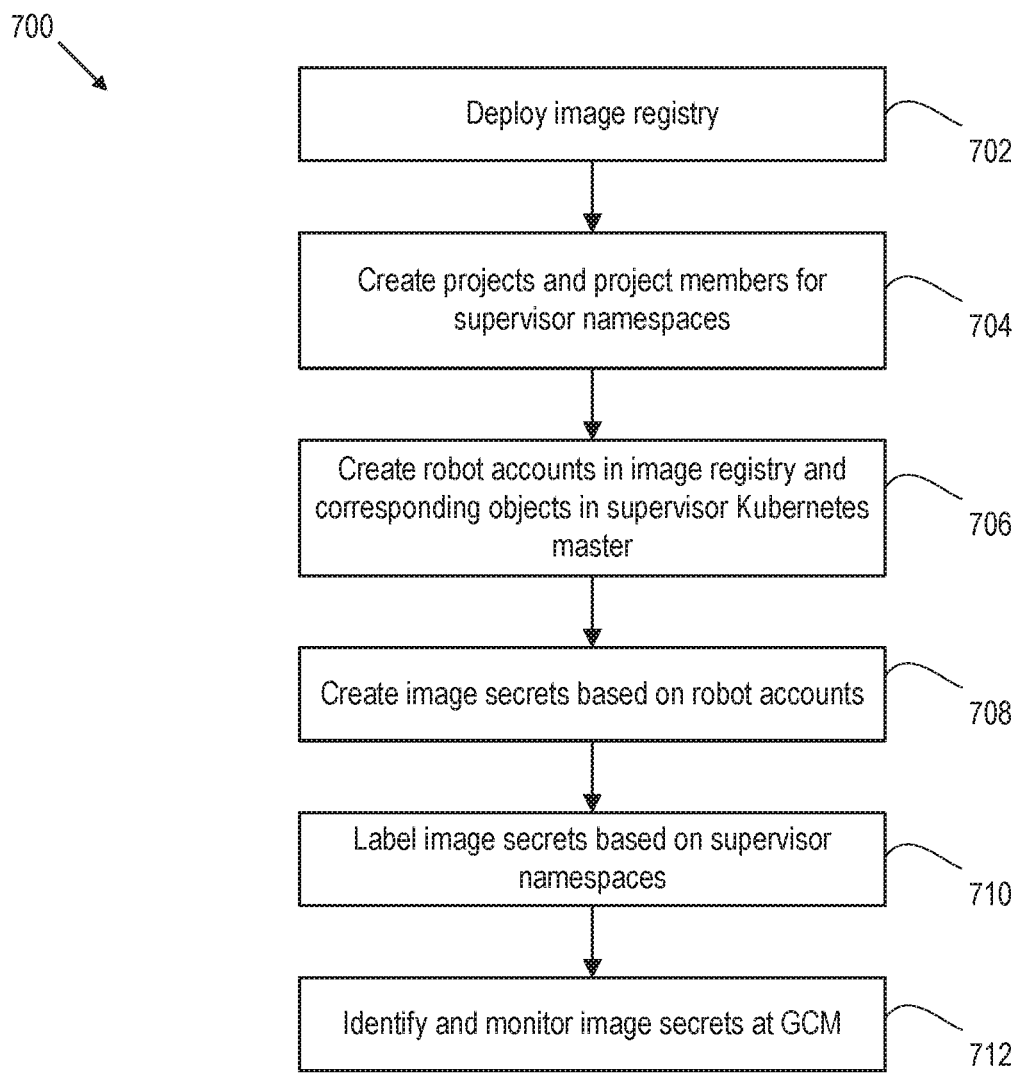
FIG. 7 is a flow diagram depicting a method of managing access to a container image registry in a virtualized computing system according to an embodiment.

FIG. 7 is a flow diagram depicting a method 700 of managing access to a container image registry in a virtualized computing system according to an embodiment. The container image registry manages container images for deploying containers in a host cluster, the host cluster including hosts and a virtualization layer executing on hardware platforms of the hosts, the virtualization layer supporting execution of virtual machines (VMs). Method 700 can be performed by software in supervisor cluster 101 executing on CPU, memory, storage, and network resources managed by virtualization layer(s) (e.g., hypervisor(s)) or a host operating system(s).

Method 700 begins at step 702, where supervisor Kubernetes master 104 deploys image registry 190 for supervisor cluster 101. Supervisor Kubernetes master 104 cooperates with registry server 111 in virtualization management server 116 to deploy and configure image registry 190. At step 704, supervisor Kubernetes master 104 creates projects for the supervisor namespaces and adds project members to each project (e.g., SSO users). At step 706, supervisor Kubernetes master 104 creates robot accounts in image registry 190 and corresponding robot objects in supervisor Kubernetes master 104. The robot accounts are created for automation users in supervisor cluster 101 (e.g., pod deployment in supervisor cluster 101). At step 708, supervisor Kubernetes master 104 creates image secrets based on the robot accounts. Each image secret corresponds to the credentials of a robot account created in image registry 190. In an embodiment, push and pull secrets are created for each robot account (e.g., for each supervisor namespace). At step 710, supervisor Kubernetes master 104 labels the image secrets based on the supervisor namespaces. The labels allow for identification of which image secrets correspond with which supervisor namespace. At step 712, supervisor Kubernetes master 104 identities and monitors image secrets using GCM 509. GCM 509 is configured to push image secrets to guest clusters based on which supervisor namespace in which the guest clusters are deployed. Further, GCM 509 is configured to update the image secrets cached in each guest cluster deployed in supervisor cluster 101. This allows each guest cluster to share the project in image registry 190 created for each supervisor namespace.

Figure 8:
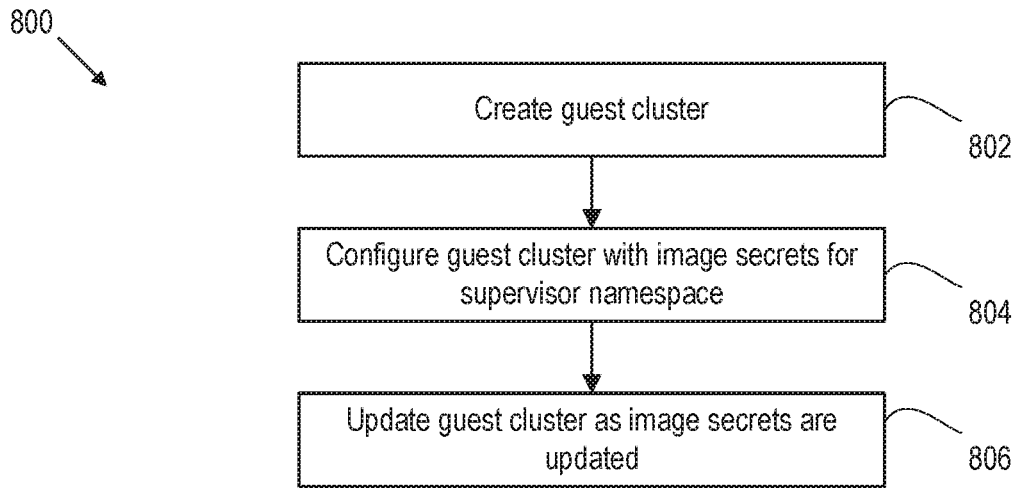
FIG. 8 is a flow diagram depicting a method of deploying a guest duster according to an embodiment.

FIG. 8 is a flow diagram depicting a method 800 of deploying a guest cluster according to an embodiment. Method 800 can be performed by software in supervisor cluster 101 executing on CPU, memory, storage, and network resources managed by virtualization layer(s) (e.g., hypervisor(s)) or a host operating system(s).

Method 800 begins at step 802, where supervisor Kubernetes master 104 creates a guest cluster. At step 804, supervisor Kubernetes master 104 configures the guest cluster with image secrets corresponding to the supervisor namespace in which the guest cluster is deployed. This allows guest cluster to push or pull images from the project associated with the supervisor namespace in image registry 190. Thus, guest cluster shares the project with supervisor cluster 101. In embodiments, supervisor Kubernetes master 104 can configure the guest cluster with other types of information related to the image registry, such as a registry certificate (which is stored as a Kubernetes secret in supervisor Kubernetes master 104). The registry certificate is used to establish an SSL connection from the guest cluster to the image registry when pulling container images during pod deployment on the guest cluster. The registry certificate secret can be monitored and updated at the guest cluster if changed similar to the image secrets. At step 806, supervisor Kubernetes master 104 (e.g., the GCM 509) updates the guest cluster as image secrets are updated in supervisor Kubernetes master 104. This maintains consistency between the image secrets in supervisor Kubernetes master 104 and the guest cluster and allows the guest cluster to continue accessing image registry 190 as the image secrets change over time (e.g., due to changing credentials of robot accounts).

Figure 9:
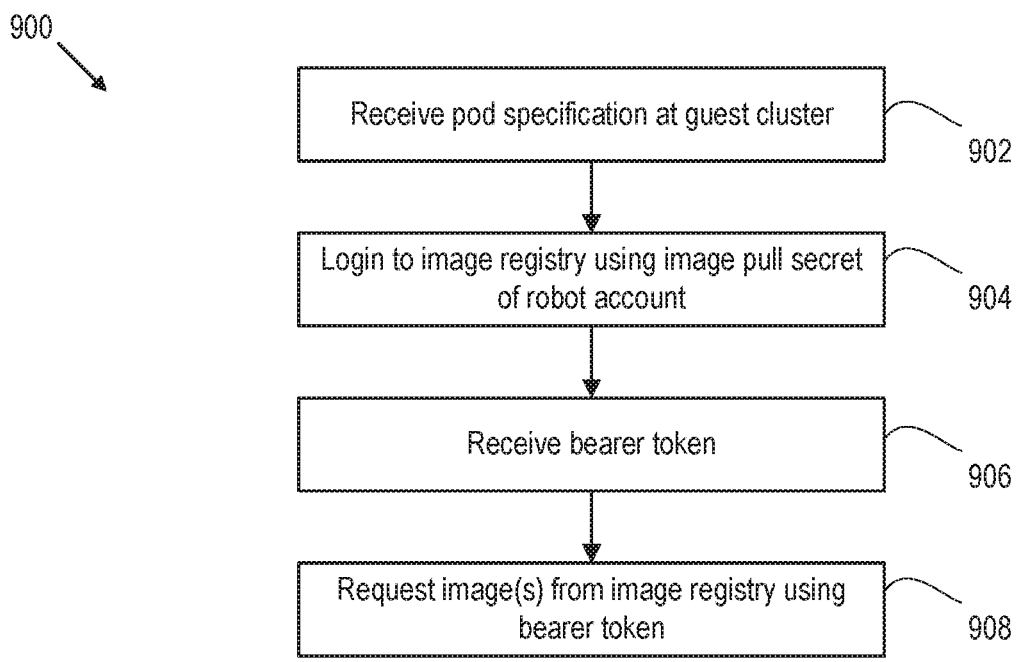
FIG. 9 is a flow diagram depicting a method of pull images from a container image registry at a guest cluster according to an embodiment.

FIG. 9 is a flow diagram depicting a method 900 of pull images from a container image registry at a guest cluster according to an embodiment. Method 900 can be performed by software in guest cluster 416 executing on CPU, memory, storage, and network resources managed by virtualization layer(s) (e.g., hypervisor(s)) or a host operating system(s).

Method 900 begins at step 902, where guest Kubernetes master 622 receives a pod specification from a user. A user can either directly specify a pod or specify another object that includes pod(s) (e.g., a deployment). The pod specification includes container image(s) for containerized applications to execute in the pod. At step 904, guest Kubernetes master 622 logs into image registry 190 using an image pull secret of a robot account. The image pull secret is provided by supervisor Kubernetes master 104 as described above. At step 906, guest Kubernetes master 622 receives a bearer token from image registry 190 upon authentication and authorization. At step 908, guest Kubernetes master 104 requests image(s) from imager registry 190 using the bearer token. The image(s) are then used to spin-up containerized applications in the deployed pod.

Figure 10:
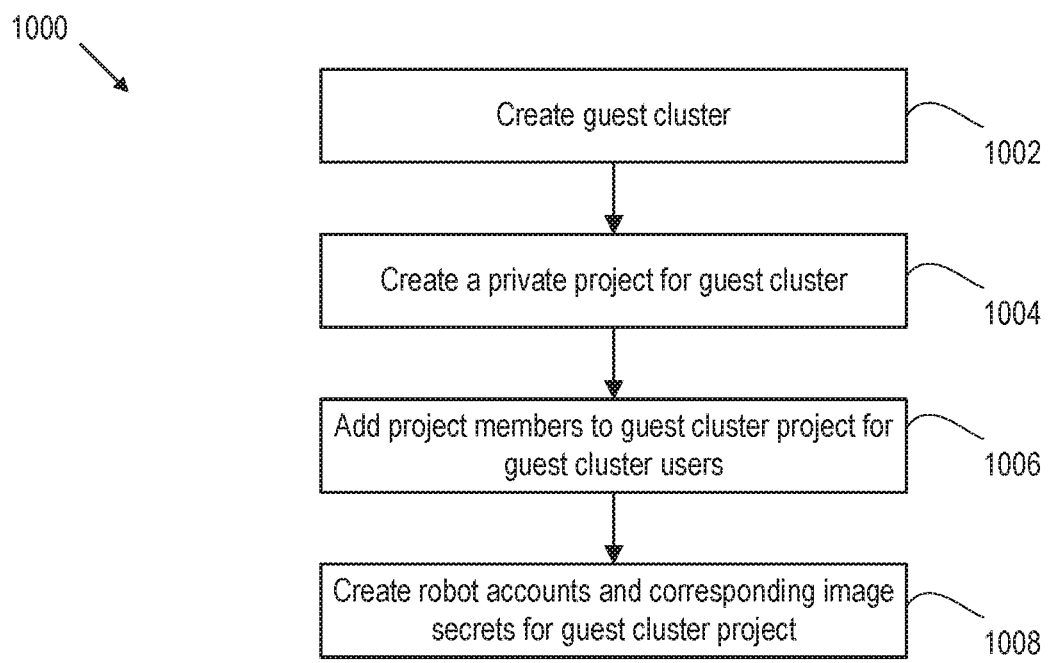
FIG. 10 is a flow diagram depicting a method of creating a project in image registry for a guest cluster according to an embodiment.

FIG. 10 is a flow diagram depicting a method 1000 of creating a project in image registry for a guest cluster according to an embodiment. Method 1000 can be performed by software in supervisor cluster 101 executing on CPU, memory, storage, and network resources managed by virtualization layer(s) (e.g., hypervisor(s)) or a host operating system(s).

Method 1000 begins at step 1002, where supervisor Kubernetes master 104 creates a guest cluster within a supervisor namespace. At step 1004, supervisor Kubernetes master 104 creates a private project in image registry 190 for the guest cluster. The guest cluster private project is separate from the project created for supervisor namespace and used by supervisor cluster 101. At step 1006, supervisor Kubernetes master 104 adds project members (e.g., SSO users) to the guest cluster private project in image registry 190. At step 1008, supervisor Kubernetes master 104 creates robot accounts and corresponding image secrets for the guest cluster private project. Supervisor Kubernetes master 104 provides the guest cluster private project information (e.g., project members, robot accounts, image secrets) to the guest cluster for use in pushing and pulling images from its guest cluster private project. In an embodiment, supervisor Kubernetes master 104 can also provide the image secrets for the supervisor namespace project to the guest cluster as described above. This allows the guest cluster to access both is private project (the guest cluster project) and the project of the supervisor namespace (which can be shared among other guest clusters and the supervisor cluster).

The embodiments described herein may employ various computer-implemented operations involving data stored in computer systems. For example, these operations may require physical manipulation of physical quantities. Usually, though not necessarily, these quantities may take the form of electrical or magnetic signals, where the quantities or representations of the quantities can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A virtualized computing system, comprising:
a host cluster having hosts and a virtualization layer executing on hardware platforms of the hosts, the virtualization layer supporting execution of virtual machines (VMs);
a container image registry configured to manage container images for deploying containers in the host cluster;
an orchestration control plane cooperating with control plane agents in the virtualization layer to provide a supervisor cluster, the orchestration control plane including a master server executing in a first VM of the VMs, the master server configured to manage image secrets based on accounts in the container image registry; and
a guest cluster, managed by the orchestration control plane as a virtual extension of the supervisor cluster and executing in second VMs of the VMs, the guest cluster configured to receive the image secrets from the master server and access the container image registry using the image secrets.

2. The virtualized computing system of claim 1, wherein the master server is configured to create a project in the container image registry for a namespace of the orchestration control plane, wherein the container image registry includes a robot account associated with the project, and wherein the image secrets are based on the robot account.

3. The virtualized computing system of claim 2, wherein the guest cluster is deployed in the namespace of the orchestration control plane.

4. The virtualized computing system of claim 2, wherein the master server is configured to create a guest cluster project for the guest cluster in the container image registry.

5. The virtualized computing system of claim 4, wherein the master server is configured to add project members to the guest cluster project, the project members corresponding to user accounts of the virtualized computing system having access to the guest cluster.

6. The virtualized computing system of claim 4, wherein the master server is configured to create a guest cluster robot account for the guest cluster project and guest cluster image secrets for the guest cluster robot account.

7. The virtualized computing system of claim 1, wherein the master server is configured to update the image secrets and provide the image secrets as updated to the guest cluster.

8. A method of managing access to a container image registry in a virtualized computing system, the container image registry managing container images for deploying containers in a host cluster, the host cluster including hosts and a virtualization layer executing on hardware platforms of the hosts, the virtualization layer supporting execution of virtual machines (VMs), the method comprising:
creating, by a registry agent, a robot account in the container image registry;
creating, by the registry agent, image secrets in a master server of an orchestration control plane control plane agents in the virtualization layer to provide a supervisor cluster, the orchestration control plane including a master server executing in a first VM of the VMs; and
providing the image secrets to a guest cluster managed by the orchestration control plane as a virtual extension of the supervisor cluster and executing in second VMs of the VMs, the image secrets enabling the guest cluster to access the container image registry through the robot account.

9. The method of claim 8, further comprising:
creating, by the registry agent, a project in the container image registry for a namespace of the orchestration control plane, wherein the robot account is associated with the project.

10. The method of claim 8, wherein the guest cluster is deployed in the namespace of the orchestration control plane.

11. The method of claim 8, further comprising:
creating, by the master server, a guest cluster project for the guest cluster in the container image registry.

12. The method of claim 11, further comprising:
adding, by the master server, project members to the guest cluster project, the project members corresponding to user accounts of the virtualized computing system having access to the guest cluster.

13. The method of claim 11, further comprising:
creating, by the registry agent, a guest cluster robot account for the guest cluster project and guest cluster image secrets for the guest cluster robot account.

14. The method of claim 8, further comprising:
updating, by the master server, the image secrets; and
providing, by the master server, the image secrets as updated to the guest cluster.

15. A non-transitory computer readable medium comprising instructions to be executed in a computing device to cause the computing device to carry out a method of managing access to a container image registry in a virtualized computing system, the container image registry managing container images for deploying containers in a host cluster, the host cluster including hosts and a virtualization layer executing on hardware platforms of the hosts, the virtualization layer supporting execution of virtual machines (VMs), the method comprising:
creating, by a registry agent, a robot account in the container image registry;
creating, by the registry agent, image secrets in a master server of an orchestration control plane cooperating with control plane agents in the virtualization layer to provide a supervisor cluster, the orchestration control plane including a master server executing in a first VM of the VMs; and
providing the image secrets to a guest cluster managed by the orchestration control plane as a virtual extension of the supervisor cluster and executing in second VMs of the VMs, the image secrets enabling the guest cluster to access the container image registry through the robot account.

16. The non-transitory computer readable medium of claim 15, further comprising:
creating, by the registry agent, a project in the container image registry for a namespace of the orchestration control plane, wherein the robot account is associated with the project.

17. The non-transitory computer readable medium of claim 15, wherein the guest cluster is deployed in the namespace of the orchestration control plane.

18. The non-transitory computer readable medium of claim 15, further comprising:
creating, by the master server, a guest cluster project for the guest cluster in the container image registry.

19. The non-transitory computer readable medium of claim 18, further comprising:

adding, by the master server, project members to the guest cluster project, the project members corresponding to user accounts of the virtualized computing system having access to the guest cluster.

20. The non-transitory computer readable medium of claim 18, further comprising:

creating, by the registry agent, a guest cluster robot account for the guest cluster project and guest cluster image secrets for the guest cluster robot account.

\* \* \* \* \*

UNITED STATES PATENT AND TRADEMARK OFFICE
CERTIFICATE OF CORRECTION

PATENT NO. : 11,422,846 B2
APPLICATION NO. : 16/933823
DATED : August 23, 2022
INVENTOR(S) : Yanping Cao et al.

Page 1 of 1

It is certified that error appears in the above-identified patent and that said Letters Patent is hereby corrected as shown below:

On the Title Page

Item (73) Assignee, replace "VMware, Inc." with -- VMware, Inc., Palo Alto, CA (US) --.

Signed and Sealed this
Twenty-fifth Day of July, 2023

Katherine Kelly Vidal
*Director of the United States Patent and Trademark Office*